(12) United States Patent
Guo et al.

(10) Patent No.: US 8,917,356 B2
(45) Date of Patent: Dec. 23, 2014

(54) PLAY CONTROL SYSTEM AND METHOD

(75) Inventors: Jianwei Guo, Qingdao (CN); Wenqiang Zhao, Qingdao (CN); Yilong Chen, Qingdao (CN); Yifang Sun, Qingdao (CN); Yong Liu, Qingdao (CN); Hongtao Qi, Qingdao (CN)

(73) Assignees: Haier Group Corporation, Qingdao (CN); Qingdao Haier Electronics Co., Ltd., Qingdao (CN)

( * ) Notice: Subject to any disclaimer, the term of this patent is extended or adjusted under 35 U.S.C. 154(b) by 0 days.

(21) Appl. No.: 14/111,565

(22) PCT Filed: Jul. 20, 2011

(86) PCT No.: PCT/CN2011/077354
§ 371 (c)(1),
(2), (4) Date: Oct. 14, 2013

(87) PCT Pub. No.: WO2012/139343
PCT Pub. Date: Oct. 18, 2012

(65) Prior Publication Data
US 2014/0036155 A1   Feb. 6, 2014

(30) Foreign Application Priority Data

Apr. 15, 2011   (CN) .......................... 2011 1 0095386

(51) Int. Cl.
*H04N 5/445*   (2011.01)
*H04N 13/00*   (2006.01)
*H04N 7/18*    (2006.01)
*H04N 21/472*  (2011.01)

(52) U.S. Cl.
CPC .......... *H40N 5/26424* (2013.01); *H04N 13/00* (2013.01); *H04N 5/445* (2013.01); *H04N 7/181* (2013.01); *H04N 21/472* (2013.01)
USPC .......................................... 348/564; 348/588

(58) Field of Classification Search
CPC ....................................................... H04N 9/74
USPC .................. 348/564, 588, 563, 565, 705, 706
See application file for complete search history.

(56) References Cited

U.S. PATENT DOCUMENTS

| 2004/0012724 A1* | 1/2004 | Jang | 348/739 |
| 2006/0012716 A1* | 1/2006 | Choi | 348/588 |

* cited by examiner

Primary Examiner — Michael Lee
(74) Attorney, Agent, or Firm — Fish & Tsang, LLP

(57) ABSTRACT

Disclosed are a play control system and method. The system includes: a display control module for dividing the display screen of electrical equipment, wherein the display control module can divide the display screen into a plurality of display area layouts; a control module for determining the current display area layout and the video signal corresponding to the picture to be displayed in each display area in the current display area layout according to an instruction; and a processing module for according to determination result of the control module, processing each video signal to be displayed according to the display requirement of the display area which needs to display the video signal and providing the processed video signal meeting the display requirement of the corresponding display area to the electrical equipment.

8 Claims, 2 Drawing Sheets for receiving one or more video signals from signal sources, determining the current display layout according to an instruction and determining a video signal corresponding to a picture display be each display area in current display area layout of the display screen of the electrical equipment — S401 according to the determination result, processing each video signal to be displayed according to the display requirement of the display area which needs to display the video signal and supplying the processed video signals meeting the display requirement of the corresponding display area to the electrical equipment — S403

PLAY CONTROL SYSTEM AND METHOD

FIELD OF THE INVENTION

The present invention relates to electrical equipment technical field, especially to a play control system and control method.

BACKGROUND

Nowadays, the technical solution for playing synchronously on multi-screens is provided. It is generally achieved by this technical solution that only two pictures can be played and displayed synchronously (e.g. displayed by a way of picture in picture) when the display for multi-screens is carried out.

Some equipments may experience a playing function or Mo-card (module-card) function for equipment by switching between the Mo-card and a signal source on the basis of the display technique of multi-screens. For example, for the television, the signal source is a signal source of television. The user may experience the playing function or Mo-card function of the equipment, but the user may not experience the Mo-card function during watching TV programs, that is, provided the user is watching TV programs, the user may experience the Mo-card function at this moment only if he/she closes the TV programs and switches the signal source to the Mo-card, resulting in that the user utilization of Mo-card function under this mode is greatly limited.

According to aforementioned contents, the prior technical solution for playing on multi-screens cannot flexibly divide and lay out the display areas of screen and cannot synchronously display the signals from different signal sources.

At the present, there is no any effective technical solution to a problem in which no relative technique can flexibly divide and lay out the display areas of screen and synchronously display the signals from different signal sources.

SUMMARY OF THE INVENTION

To the problem in which no relative technique can flexibly divide and lay out the display areas of screen and synchronously display the signals from different signal sources, the present invention provides a play control system and control method, which can flexibly arrange different display layouts on the electrical equipment and can supply multi-channel signals to be displayed to the electrical equipment to achieve synchronous display for multi-channel signals even if the display signals come from different signal sources.

The technical solution of the present invention is achieved by following:

According to one aspect of the present invention, a display control system is provided for managing the display of electrical equipment.

The system includes: a display control module for dividing the display screen of said electrical equipment into plurality of display area layouts, a receiving module for receiving one or more video signals from a video source, a control module for determining a current display area layout according to an instruction and determining the video signals corresponding to pictures to be displayed by each display area in said current display area layout, a processing module for processing each video signal to be displayed according to the determination result and a display requirement of a display area which needs to display said video signal and providing the processed video signal satisfying with the display requirement of the corresponding display area to said electrical equipment.

The system further includes: a configuration module for configuring a display status of an interface of application installed on said display control system in the corresponding display area when said display screen displays the interface of application and configuring a display status of said interface in a new display area when the display area of said interface is changed, and said processing module is further used for providing a signal configured by said configuration module and corresponding to an interface of current display area to said electrical equipment.

Furthermore, aforementioned control module is further used for determining plurality of video signals to be displayed which correspond to a picture displayed by at least one display area, determining a video signal which needs to be displayed first from plurality video signals to be displayed and replacing the current displayed video signal with other video signals to be displayed according to an instruction.

Moreover, the processing module is further used for simultaneously providing plurality of video signals displayed by one or more display areas to said electrical equipment.

Preferably, the system further includes: a picture effectiveness processing module for processing a menu displayed on the display screen of said electrical equipment in a 3D manner.

Preferably, the system further includes: a focus control module for setting one or more display areas being currently operated according to an instruction as a focus of operation objects in a currently used display area layout.

According to other aspect of the present invention, a display control method is further provided for controlling the display of electrical equipment.

The display control method includes: a step for receiving one or more video signals from a signal source; a step for determining the current display area layout according to an instruction; and a step for determining the video signals corresponding to pictures to be displayed by each display area in said current display area layout of display screen of said electrical equipment, wherein, the current display area layout is acquired by dividing the display screen of electrical equipment, a step for processing each video signal to be displayed according to the determination result and a display requirement of a display area which needs to display said video signal, and providing the processed video signal satisfying with the display requirement of the corresponding display area to said electrical equipment.

The display control method further includes: a step for configuring a display status of an interface of application installed on said display control system in the corresponding display area when said display screen displays the interface of application and configuring a display status of said interface in a new display area when the display area of said interface is changed, a step for providing a signal corresponding to an interface of current display area to said electrical equipment.

Furthermore, the step for determining the video signals corresponding to pictures to be displayed by each display area in said current display area layout of display screen of said electrical equipment, includes: determining plurality of video signals to be displayed which correspond to a picture displayed by at least one display area, determining a video signal which needs to be displayed first from plurality video signals to be displayed and replacing the current displayed video signal with other video signals to be displayed according to an instruction, simultaneously providing plurality of video signals displayed by one or more display areas to said electrical equipment.

Preferably, the method further includes: a step for processing a menu in a 3D manner when the display screen of said electrical equipment needs to display the menu.

Preferably, the method further includes: a step for setting one or more display areas being currently operated according to an instruction as a focus of operation objects in a currently used display area layout.

According to the present invention, the display screen of the electrical equipment is flexibly divided and the signals to be displayed by each display area after dividing are processed respectively, so as to flexibly arrange the display layouts of the display screen and achieve the synchronous display for multi-channel signals, avoid a problem of relevant prior art which cannot synchronously display the signals from different signal sources and achieve all-in-one display for multiple equipments (for example, including television, computer, PDA and etc).

DETAILED DESCRIPTION OF THE INVENTION

According to the embodiments of the present invention, a play control system is provided, which can be used to control the display of electric equipment.

Figure 1:
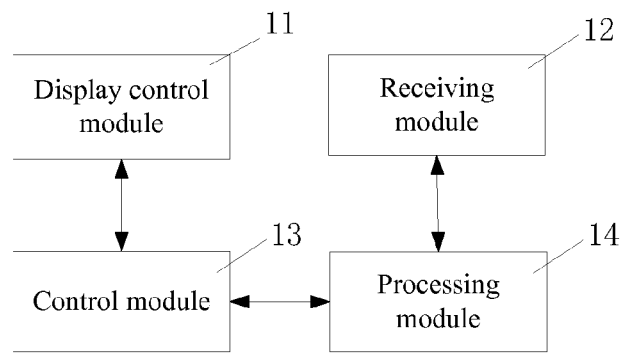
FIG. 1 is a block diagram showing a play control system of an embodiment of the present invention.

As FIG. 1 shown, the play control system according to the present invention includes:
a display control module 11 for dividing the display screen of electrical equipment, wherein, the display control module can divide the display screen into plurality of display area layouts;
a receiving module 12 for receiving one or more video signals from signal sources;
a control module 13 connected to the display control module 11, which is for determining the current display area layout and video signals corresponding to a picture to be displayed in each display area of the current display area layout according to an instruction;
a processing module 14 connected to the control module 13 and the receiving module 12, which is for, according to the determination result of the control module 13, processing each video signal to be displayed according to the display requirement of the display area which needs to display the video signal and supplying the processed video signals meeting the display requirement of the corresponding display area to the electrical equipment.

By means of the aforementioned system, the display screen of the electrical equipment is flexibly divided and the signals to be displayed by each display area after dividing are processed respectively, so as to flexibly arrange the display layouts of the display screen and achieve the synchronous display for multi-channel signals, avoid a problem of relevant prior art which cannot synchronously display the signals from different signal sources and achieve all-in-one display for multiple equipments (for example, including television, computer, PDA and etc).

The functional frame of the system of the present invention will be described in detail accompanying with the FIGS. 1 and 2.

The processing module for dividing screen may flexibly divide the screen on the basis of the overall size of the electrical equipment. Specifically, the screen can be divided into different windows and pictures. A "container" is assigned to each window by software algorithm on the basis of WPF (Windows Presentation Foundation). This container defines different properties, such as size of the window, rendering methods, choice of content and etc. Each container property can be amended by software definition and algorithm so as to achieve the changes for picture size and position of different windows on the television interface. As an example of the television display screen, the system of the present invention can divide 21:9 super wide screen of television. The 21:9 television program sources barely have movies and applications which are totally suitable to such screen size, and the common television signals are generally on the basis of 4:3 television screen size, only few of these are for 16:9 high definition television. Therefore, even if all users watch high definition television, nearly 5:9 screen (be wasted) cannot also display any information. The present application can divide the 21:9 screen into two portions which respectively have 16:9 proportion and 5:9 proportion. The user can watch TV programs on the 16:9 portion, and the 5:9 portion simultaneously display other information, such as web pages, electric magazines, news, forecast, video chat, mini-games and etc.

Moreover, in addition to divide the screen into 16:9 portion and the 5:9 portion, the television screen can be also divided into three, fourth and even more display areas. The user may choose the specific dividing strategies. Specifically, the processing module for dividing screen can divide the display screen on the basis of the XML Application Markup Language (XAML).

In practice, the signals having to be displayed by the electrical equipment includes the signals received from outside by the display control system, the signals generated by the display control system itself and the signals received by the electrical equipment and then transmitted to the display control system by the electrical equipment so as to be processed.

For an example, the display control system can be equipment such as computer, and the display control system can be installed with various applications. In order to guarantee that the applications on the display control system can be loaded dynamically and correctly displayed on the display screen of the electrical equipment, the system can further include a configuration module (not shown) connected to the processing module 14. The configuration module can be used to configure the display status of the interface in corresponding display area when the display screen needs to display the application interface installed in the display control system, and configure the display status of the interface in a new display area when the display area including the interface is changed. Moreover, the processing module 14 is further used to supply the signal configured by the configuration module and corresponding to the interface in the current display area to the electrical equipment.

Thereinto, most of applications have respective interface. However, the respective interface of applications cannot match with the display areas having different dimensional proportion and/or size. For an example, when the smaller display area displays the application area, it may result in that the tiny information on the interface cannot be clearly seen by the user. Moreover, the display area mismatching the size of application interface is likely to be unable to completely display all contents of the application interface. By configuring the interface applying to different display area and being displayed (e.g. the application may be configured to have a status for big screen browsing and a status for small screen browsing), it can guarantee that the information of the interface cannot being discarded when the application interface is displayed in each display area and guarantee the information of the interface to be see clearly by the user. The specific configuration way may include any one or combination of the adjustment for interface size, the adjustment for proportion of the horizontal to vertical of the interface, discarding the extra part (a part not include information) of the interface border, the adjustment for size of font, icon and any information like that on the interface, discarding the extra information on the interface, the adjustment for display resolution of the application interface, so as to complete the switch applying between different status and specific configuration and further define the operation modes and effectiveness applied to different status.

In practice, in order to uniformly manage all of data, all applications may be encapsulated into a DLL (Dynamic Link Library) and a configuration file is added for recording the application type, directory and the information like that. According to the configuration file and the DLL information, the application can be loaded to the list of application programs and the HOME menu. In this case, the dynamic loading of the application can be achieved by means of custom HOME menu and sub-screen window, and the loading process can be executed by means of WPF-data loading technique.

Preferably, in order to guarantee the displayed menu more beautiful, the system may further include:
a picture effectiveness processing module for processing the menu displayed on the display screen of electrical equipment in a 3D manner. Specifically, the picture effectiveness processing module can make switch effects of some application list and application status by use of WPF3D. By means of special effects of 3D, the experience effectiveness for the user can be increased, and the visual effects are beautified.

The conventional television is limited to the performance of hardware platform and the level of operating system and is hard to indeed achieve 3D graphic effect of the television menu, and if hope to improve the display for the menu, it will take a very long development time and lower working efficiency, and the television itself does not possess upgrade property and must be replaced to complete upgrade. By means of the display control system of the present invention, the menu to be displayed may be processed in a 3D manner by the processing performance of the system so as to provide new user graphic interface for multimedia interchange. It is possible to organize the application programs, graphics, video, audio and documentation and etc, and it is possible to achieve real 3D graphic menu in a fast and efficient way. If an upgrade is needed at the same time, it is possible to complete the upgrade and renewal of the menu by means of the software upgrade. This kind of 3D processing manner can be achieved by WPF3D.

For the purpose of achieving effective operation for each display area by user, aforementioned system may further include a focus control module for setting one or more display areas being currently operated according to an instruction as a focus in a currently used display area layout. In this case, if an instruction (for examples, adjusting channel displayed on one display area, closing one display area, switching the signal in one display area to other signals) for operating a certain display area is received, the display control system will consider that the instruction aims at the display area set as focus and then operate the display area. Because lots of operations are completed generally by a remote control, the focus may be switched between plurality of display areas (e.g. main screen and sub-screen) by the focus setting function, and the focus can be returned to the default display area according to user's instruction after increasing application or confirming dialog box.

Figure 2:
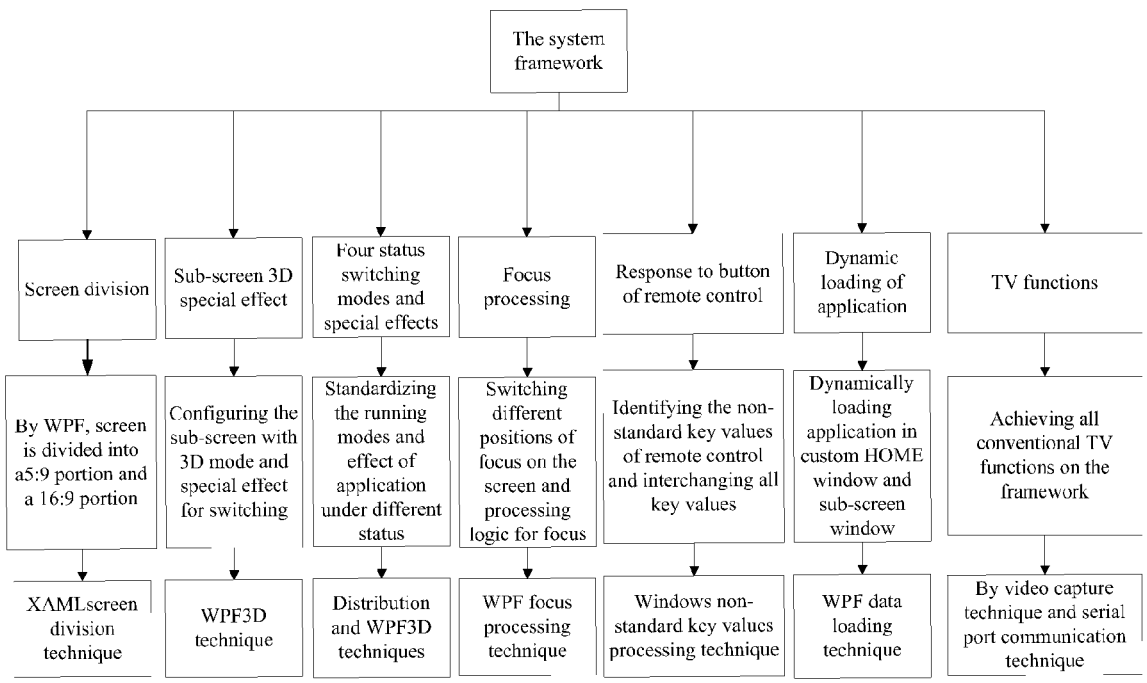
FIG. 2 is a view showing the functional frame of the play control system of an embodiment of the present invention.

Moreover, in the function frame show in FIG. 2, the system of the present invention can also perform a process of non-standard key values and standard key values for operation system (e.g. Windows operation system). Specifically, in the case of Windows operation system, non-standard key values .NET is not defined in the Windows operation system and thus the non-standard key values cannot be process by a method for standard key values. Therefore, it is necessary to acquire the non-standard key values by a method for non-standard key values, and then process the acquired key values, after then do corresponding action. Second, although the standard key values .NET has its own processing method, in order to avoid interference between the key values in different applications and the operation system, the acquired standard key values are re-encoded and then sent to the applications, the applications will do corresponding action according to the received new code.

By defining non-standard key values, the communicated electrical equipment can be remote controlled by key values not defined in the display control system on the basis of the display control system (e.g. a computer installed with the Windows operation system).

The system according to the present invention may further include the basic functions of television, that is, the conventional television functions are guaranteed to be achieved on the functional frame of the system according to the present invention. The conventional television functions specifically include video capture technique and serial port communication technique.

Thereinto, the video capture technique is: capturing the television end signals (TV programs, DVD, VGA and etc) to the chip (e.g. x86 chip) of the display control system. The chip processes the captured signals by video card and software and then displays the processed data on a designated area of screen.

The serial port communication technique is: the operation for searching TV channels, changing channels and setting television chip should be performed by manipulating the chip. However, the input information of the externally connected devices (remote control, mouse, keyboard and etc) can be only received by x86 chip and thus the operation for television chip is achieved by sending instructions to the television chip via serial port communication.

Moreover, the control module can be further used to determine plurality of video signals to be displayed corresponding to a picture displayed by at least one display area according to an instruction and determine a video signal which needs to be first displayed from the video signals to be displayed and replace the current displayed video signal with other video signals to be displayed according to an instruction. Moreover, the processing module is further used to simultaneously supply plurality of video signals which need to be displayed by one or more display area to the display equipments.

In other words, one or more display area in the current display layout can be supplied with multi-channel signals. For the display area supplied with multi-channel signals, the user can choose which signal's display picture to be put on the top layer for displaying. Moreover, the user can put other signals supplied to the display area to the top layer for displaying at any time according to requirement, so as to complete the change of display picture. Due to multi-channel signals being supplied to the electrical equipment for displaying picture, the lag is not occurred for the process even if the user performs an operation for changing picture.

In general, the display control system can be configured to have a main processing module (e.g. x86 module), and the main processing module can be set as a unique final output chip. All of the television functions and DVD, VGA and the signals accessed conventionally by the television are captured to the x86 chip from the television chip by the main processing module via the video capture technique and output to the display equipment after being processed by the x86 chip.

Moreover, the technical solution of the present invention is adapted to provide a uniform programming model, language and framework. The television picture and content of each network are simultaneously laid out within one framework to achieve synchronous process and synchronous display. In addition, it is also possible to achieve the separation of the designer and developer and improve development efficiency.

Figures 3, 4:
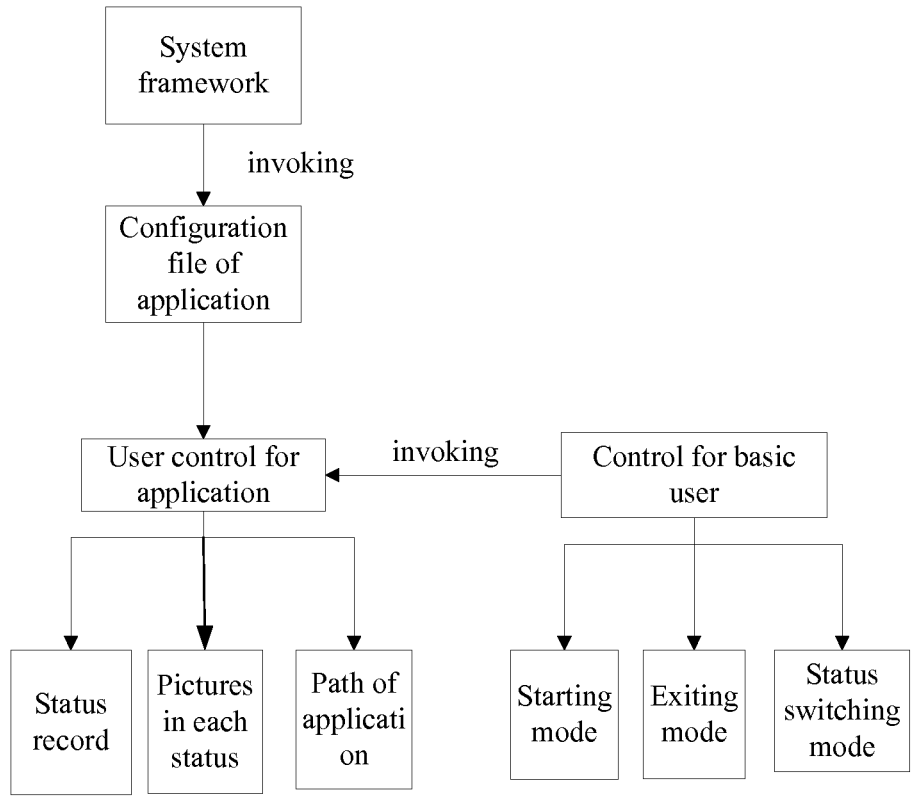
FIG. 3 is a schematic view showing the start principle of the play control system of an embodiment of the present invention.
FIG. 4 is a flow chart of a play control method of an embodiment of the present invention.

As FIG. 3 shown, when the system of the present invention starts, first starting the functional frame, and then loading the configuration files of the application, after then starting the application user control which mainly includes the application records under different status, different display status of the application (status picture, animation and etc) and save path of the application file. Moreover, in this step, the basic user control can be used, which includes the starting mode, the quit mode and the status switching mode of the application, in order to guarantee that the application can be normally started and quitted under each status and switched between each status.

It can be seen from above that the system of the present invention can organize the television picture, application, graphic, video, audio and documentation together and simultaneously display them on one framework and display them via 3D graphic menu. The display for beautified interface improves the user experience. Furthermore, the system can provide the uniform programming model, language and framework and achieve the working separation of the interface designer and developer in a fast and efficient manner. At the same time, if needs an upgrade, the upgrade and renewal of new menu can be achieved fast. Moreover, the display control system can operate each large application and display it by the electrical equipment so as to bring super screen experience for user.

According to the embodiment of the present invention, a display control method is also provided for controlling the display of the electrical equipment.

As FIG. 4 shown, the display control method according to the present invention includes:

Step S401 for receiving one or more video signals from signal sources, determining the current display layout according to an instruction and determining a video signal corresponding to a picture display be each display area in current display area layout of the display screen of the electrical equipment. Thereinto, the current display area layout is acquired by dividing the display screen of electrical equipment.

Step S403 for, according to the determination result, processing each video signal to be displayed according to the display requirement of the display area which needs to display the video signal and supplying the processed video signals meeting the display requirement of the corresponding display area to the electrical equipment.

The method further includes: configuring the display status for the interface in corresponding display area when the interface of application installed on the display control system needs to be displayed by the display screen and configuring the display status for the interface in a new display area when the display area of the interface is changed, after then supplying the configured signals of the interface corresponding to the current display area to the electrical equipment.

Moreover, when the video signals corresponding to the pictures displayed by each display area in the current display area layout of the display screen of the electrical equipment is determined, determining plurality of video signals to be displayed which correspond to the pictures displayed by at least one display area, and determining a video signal which needs to be first displayed from the video signals to be displayed and replacing the current displayed video signal with other video signals to be displayed according to an instruction and simultaneously supplying plurality of video signals which need to be displayed by one or more display area to the display equipments.

Furthermore, the method further includes: when the electrical equipment needs to display a menu on a display screen thereof, processing the menu in a 3D manner.

Furthermore, the method may also include: setting one or more display area being currently operated according to an instruction as a focus in a currently used display area layout.

In conclusion, by means of the aforementioned system, the display screen of the electrical equipment is flexibly divided and the signals to be displayed by each display area after dividing are processed respectively, so as to flexibly arrange the display layouts of the display screen and achieve the synchronous display for multi-channel signals, avoid a problem of relevant prior art which cannot synchronously display the signals from different signal sources and achieve all-in-one display for multiple equipments (for example, including television, computer, PDA and etc). Moreover, the system of the present invention can organize the television picture, application, graphic, video, audio and documentation together and simultaneously display them on one framework and display them via 3D graphic menu. The display for beautified interface improves the user experience. Furthermore, the system can provide the uniform programming model, language and framework and achieve the working separation of the interface designer and developer in a fast and efficient manner. At the same time, if needs an upgrade, the upgrade and renewal of new menu can be achieved fast. Moreover, the display control system can operate each large application and display it by the electrical equipment so as to bring super screen experience for user.

The aforementioned description is only the preferable embodiment of the present invention and not used to limit the present invention. Any amendment, equivalent replacement, improvement and etc made within the spirit and principle of the present invention should be contained with the protection range of the present invention.

What is claimed is:

1. A display control system for controlling the display of electrical equipment, comprising:
   a display control module for dividing the display screen of said electrical equipment into plurality of display area layouts;
   a receiving module for receiving video signals from one or more video sources;
   a control module for determining a current display area layout of said display control module according to an instruction and determining the video signals displayed by each display area in said current display area layout;
   a processing module for processing each corresponding video signal to be displayed according to the determination result and a display requirement of each display area and providing the processed video signal to said electrical equipment; and a configuration module for configuring a display status of an interface of application installed on said display control system in the corresponding display area when said display screen displays the interface of application and configuring a display status of said interface in a new display area when the display area of said interface is changed, and wherein said processing module is further used for providing a signal configured by said configuration module and corresponding to an interface of current display area to said electrical equipment.

2. The display control system according to the claim 1, wherein, said control module is further used for determining plurality of video signals to be displayed which correspond to at least one display area, according to an instruction and determining a video signal which needs to be displayed first from plurality video signals to be displayed and replacing the current displayed video signal with other video signals to be displayed according to an instruction, and said processing module is further used for providing plurality of video signals displayed by one or more display areas to said electrical equipment.

3. The display control system according to the claim 1, wherein, further comprising:

a picture effectiveness processing module for processing a menu displayed by the display screen of said electrical equipment in a 3D manner.

4. The display control system according to the claim 1, wherein, further comprising:

a focus control module for setting one or more display areas being currently operated according to an instruction as a focus of operation objects in the current display area layout.

5. A display control method for controlling the display of electrical equipment, comprising:

a step for receiving video signals from one or more signal sources;

a step for determining the current display area layout according to an instruction and dividing the display screen of electrical equipment thereby;

a step for determining the video signals to be displayed by each display area in said current display area layout of display screen of said electrical equipment;

a step for processing each corresponding video signal to be displayed according to the determination result and a display requirement of each display area, and providing the processed video signal to said electrical equipment;

a step for configuring a display status of an interface of application installed on said display control system in the corresponding display area when said display screen displays the interface of application and configuring a display status of said interface in a new display area when the display area of said interface is changed; and a step for providing a signal corresponding to an interface of current display area to said electrical equipment.

6. The display control method according to the claim 5, wherein, the step for determining the video signals to be displayed by each display area in said current display area layout of display screen of said electrical equipment, comprising:

determining plurality of video signals to be displayed which correspond to at least one display area, according to an instruction and determining a video signal which needs to be displayed first from plurality video signals to be displayed and replacing the current displayed video signal with other video signals to be displayed according to an instruction.

7. The display control method according to the claim 5, wherein, further comprising:

a step for processing a menu in a 3D manner when the display screen of said electrical equipment needs to display the menu.

8. The display control method according to the claim 5, wherein, further comprising:

a step for setting one or more display areas being currently operated according to an instruction as a focus of operation objects in the current display area layout.

* * * * *